United States Patent

[11] 3,630,314

[72] Inventors Milton D. Bamburg
Rt. 4, Box 502, West Monroe, La. 71291;
Bobby R. Russel, Route 1, Calhoun, La. 71225
[21] Appl. No. 90,723
[22] Filed Nov. 18, 1970
[45] Patented Dec. 28, 1971

[54] PORTABLE HUNTING STAND
15 Claims, 13 Drawing Figs.
[52] U.S. Cl. .................................................. 182/116, 182/163, 182/178, 182/206
[51] Int. Cl. ...................................................... E06c 7/48, E06c 7/50
[50] Field of Search ........................................... 182/187, 116, 178, 83, 93, 206, 163

[56] References Cited
UNITED STATES PATENTS

| 2,957,541 | 10/1960 | Everest | 182/206 |
| 3,282,375 | 11/1966 | Ray | 182/163 |
| 1,422,654 | 7/1922 | Bilger et al. | 182/178 |
| 2,881,028 | 4/1959 | Baird | 182/116 |
| 3,057,431 | 10/1962 | George | 182/116 |

FOREIGN PATENTS

| 1,262,209 | 4/1961 | France | 182/116 |

Primary Examiner—Reinaldo P. Machado
Attorney—David L. Ray

ABSTRACT: A lightweight, portable hunting stand including two or more ladderlike sections and an upper curved platform section upon which the hunter sits. The lower section rests upon the ground and the upper section leans against a tree trunk.

INVENTORS
M. D. BAMBURG
B. R. RUSSEL
BY David L. Ray
ATTORNEY

PATENTED DEC 28 1971 3,630,314

INVENTORS
M. D. BAMBURG
B. R. RUSSEL

BY David L. Ray
ATTORNEY

PORTABLE HUNTING STAND

BACKGROUND OF THE INVENTION

Deer hunters and other sportsmen frequently build platforms in trees several feet above the ground to sit upon to conceal themselves from deer or other game animals since animals pursued by dogs through a wooded area seldom look upward for hunters. The elevation of the hunter above the line of vision of the hunted game greatly reduces the probability that the hunter will be detected. In addition, the chance that the hunter may be scented by the animal is greatly reduced. Furthermore, the hunter is in a much safer position by being well above the line of fire of other hunters.

Hunting stands or platforms are most commonly permanently attached to a large tree. One disadvantage of such platforms is that they usually deteriorate quickly due to exposure to the elements throughout the year. Another disadvantage of stationary platforms is that they prohibit the hunter from easily and rapidly moving to an area where game is more plentiful.

Various portable hunting stands are known in the art which overcome some of the disadvantages of stationary stands. Exemplary of such prior art stands are U.S. Pat. No. 3,336,999 which discloses a portable hunting stand which contains a clamp for affixing the stand to a tree; U.S. Pat. No. 3,282,375 which discloses a portable hunting stand which contains wheels for transporting the stand; and U.S. Pat. No. 3,057,431 which discloses a portable hunting stand containing a U-shaped latch for attaching two of the sections of the hunting stand together. However, all are relatively complex in design and expensive to manufacture. Such hunting stands are relatively difficult to assemble in addition to being heavy.

It is an object of the present invention to provide a lightweight hunting stand which may be readily transported and assembled by one man.

It is another object of the present invention to provide a compact hunting stand which may be easily transported in the trunk of an automobile.

It is an additional object of the present invention to provide a hunting stand which is durable and inexpensive to manufacture.

THE INVENTION

The foregoing objects are realized in a portable hunting stand which includes a lower ladder section, an upper ladder section connected to the lower ladder section, and a platform section connected to the upper ladder section. Additional objects and advantages will become apparent by referring to the accompanying drawings in which.

Figure 1:
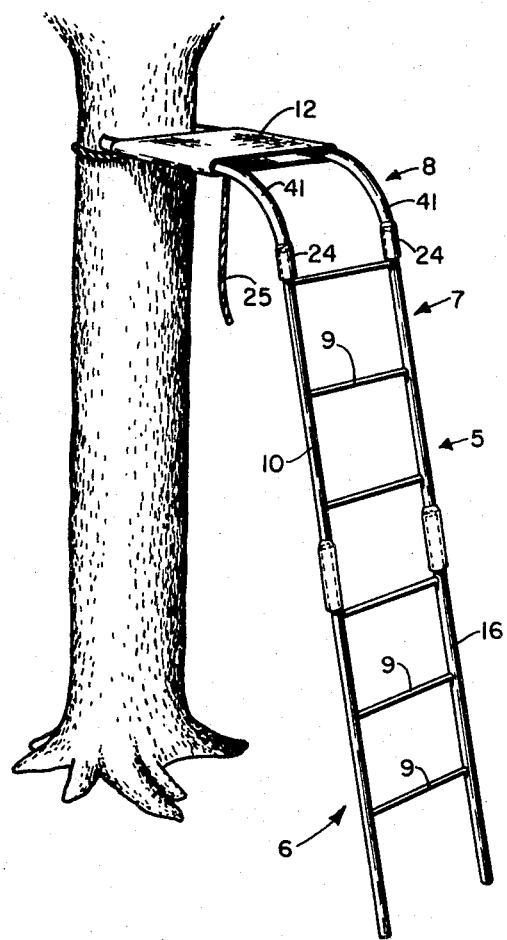
FIG. 1 is a perspective view of the portable hunting platform of the present invention erected and ready for use.
Figures 2, 3:
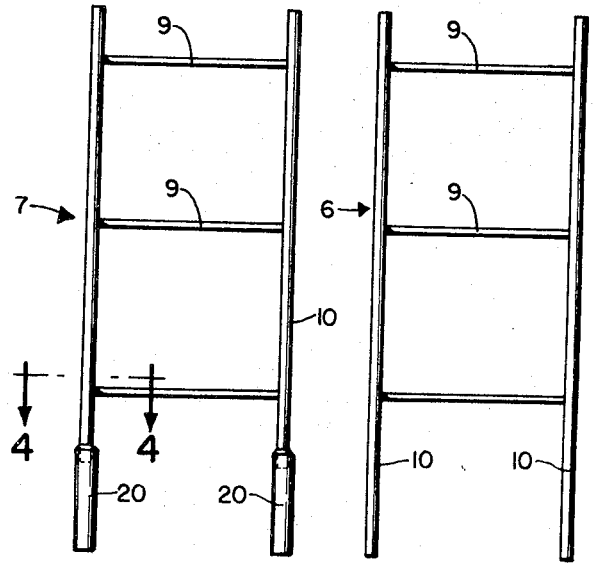
FIG. 2 is an elevational view of the upper ladder section of the hunting platform.
FIG. 3 is an elevational view of the lower ladder section of the hunting platform.
Figure 5:
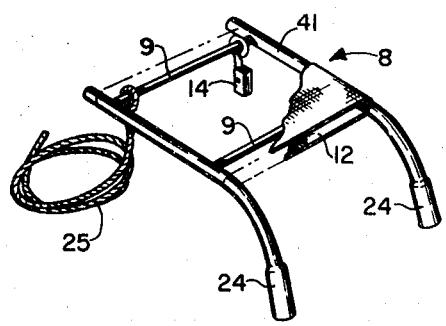
FIG. 5 is a perspective view of the platform section of the hunting platform.

Referring now to FIG. 1, it will be seen that the embodiment of the invention which has been illustrated comprises a ladder of structural magnesium or other suitable material which is designated generally by the reference numeral 5. The ladder 5, which may be of any suitable dimensions, consists of three sections. The three sections of the ladder are shown in FIGS. 2, 3, and 5, respectively. The section shown in FIG. 3 is the lower ladder section 6 and comprises cylindrical rails 10 and cylindrical rungs 9.

The upper ladder section shown in FIG. 2 has rungs 9 and rails 10 as does lower ladder section 6. In addition, upper ladder section 7 has sockets 20 which are circular in cross section and slightly larger in inner diameter than the outer diameter of rails 10.

Figure 4:
FIG. 4 is an enlarged partially sectional view taken along line 4—4 of FIG. 2.

FIG. 4 is a partially cross-sectional view taken along lines 4—4 of FIG. 2 depicting a typical joint of rung 9 to rail 10. Rail 10 is circular in cross section. Rung 9 is inserted through an opening in rail 10 and fits into the interior of rail 10. The end 40 of the rung butts against the interior of rung 10, as is shown in FIG. 4. Rung 9 is fastened to rail 10 by means of a weld 22. It is very important that rung 9 be inserted into the interior of rail 10 since the strength of the joint is greatly increased thereby.

The platform section 8 of the portable hunting stand is shown in FIGS. 1 and 5. The platform section 8 comprises two rungs 9 and two curved, cylindrical rails 41 having sockets 24 on the lower ends thereof for receiving the upper ends of the rails 10 of upper ladder section 7. In addition, platform section 8 has a rope 25 attached thereto and a locking device 14 for securing the rope to platform section 8 after the rope has been passed around a tree trunk.

Stretched over the platform section is a fabric platform 12 which preferably is made from a flexible fabric material such as nylon, orlon, or the like. The platform could be made of rigid plastic, aluminum or other lightweight material.

Figure 6:
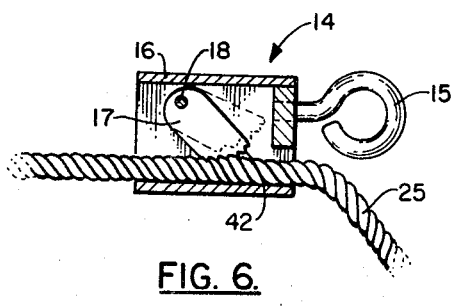
FIG. 6 is a partially sectional side view of the rope locking device.

The locking device 14 is shown in detail in FIG. 6. The locking device consists of a casing 16 having an eyebolt 15 attached thereto. Rung 9 passes through the eyebolt 15 as shown in FIG. 5. The casing 14 has a pin 18 fastened to each side thereof around which finger 17 pivots. Finger 17 has teeth 42 on the end thereof as shown in FIG. 6. Rope 25 is inserted through the lock 14 and then pulled in the reverse direction to cause finger 17 to move downward with the rope. When rope 25 is pulled tight teeth 42 of finger 17 bite into the rope 25 to secure the rope to the lock.

As can be seen in FIG. 1, the rails 10 of lower ladder section 6 fit into sockets 20 of the upper ladder section 7 to join the two sections together. The rails 10 of the upper ladder section 7 in turn fit into the sockets 24 of the platform section 8 to join section 8 to section 7. The outside diameter of the rails 10 must be chosen sufficiently close to the inside diameter of sockets 20 and 24 to provide a snug fit.

The three sections 6, 7 and 8 may also be joined by means of a cylindrical pin, one end of which can be inserted into the interior of a rail of one section and fastened thereto by welding or other suitable means. The other end of the pin is inserted into the interior of a rail of another section, thereby connecting the two rails together.

The rails of sections 6, 7, and 8 may be rectangular in cross section rather than circular. Such a rectangular rail is shown in FIGS. 7 and 8 and is designated by the numeral 11.

Figure 7:
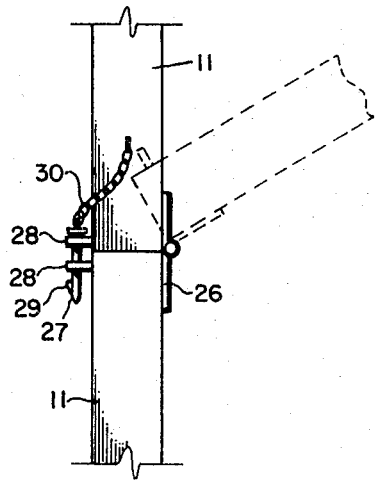
FIG. 7 is an elevational view of a hinged joint.

FIG. 7 illustrates a hinged joint which may be used to join either lower ladder section 6 to upper ladder section 7, or to join upper ladder section 7 to platform section 8. The hinges 26 shown in FIG. 7 may be welded or fastened by any other suitable means to each of the rectangular rail sections 11. Hasps 28 are attached to each of rail sections 11. Hasps 28 have holes therein (not shown) for insertion of a pin 27 to lock the two rail sections 11 together. The pin 27 has a spring-loaded ear 29 therein to prevent the pin from being pulled through the holes in the hasp without depressing the ear. Attached to pin 27 is a chain 30 which is also attached to rail section 11. The chain prevents the pin from being lost when the pin is removed from the two hasps.

Figure 8:
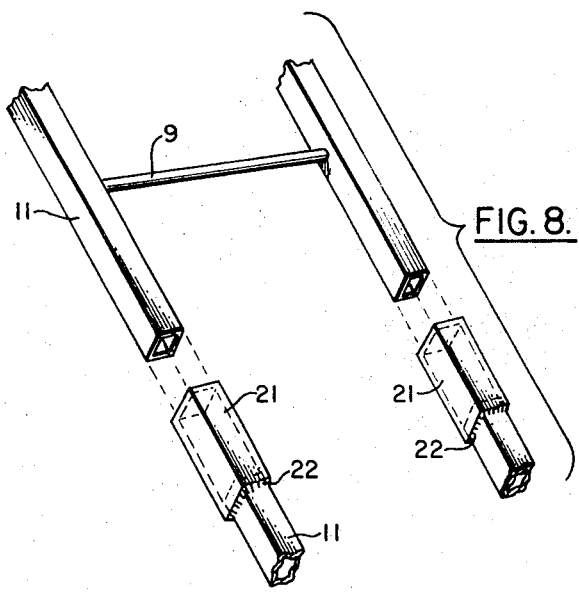
FIG. 8 is a perspective view of a slip joint.

A preferred embodiment of the present invention is shown in FIG. 8. Rectangular rails 11 have attached thereto hollow sockets 21 of rectangular cross section slightly larger in internal dimension than the outer dimensions of rail section 11. The sockets 21 are connected to rail sections 11 by welds 22. Rail sections 11 are connected to sockets 21 by sliding the sections into the interior of sockets 21.

The internal dimensions of sockets 21 are chosen sufficiently close to the external dimensions of rail 11 to make rail 11 fit securely in socket 21 yet loosely enough to be removed by hand. Sockets 21 may be substituted for sockets 20 and 24 shown in FIGS. 2 and 3, respectively, when rectangular rails 11 are employed.

Figure 9:
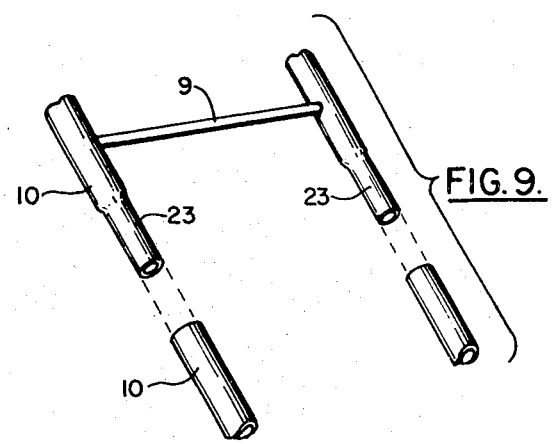
FIG. 9 is a perspective view of a swaged slip joint.

In FIG. 9 is shown the most preferred means for joining the three sections 6, 7, and 8 of the portable hunting stand together. Cylindrical rails 10 have swaged end portions 23 which are slightly smaller in outside diameter than the inside diameter of rail 10 to insure contact between end portions 23 and the inside of rail 10. The swaged end portions 23 may be slightly tapered toward the end to insure a tight fit. Swaged end joints are the most preferred because they are lighter, lower in cost, and easier to assemble than any other type of joint.

Figure 10:
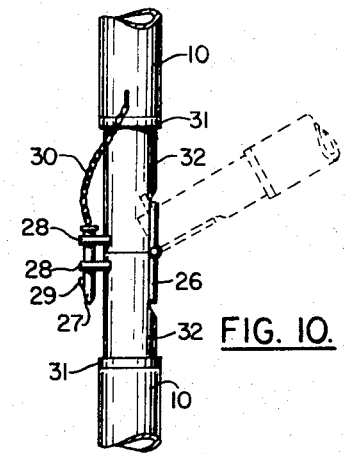
FIG. 10 is an elevational view of a hinged joint.

FIG. 10 shows another type of joint which may be employed with either cylindrical rails 10 or with rectangular rails 11. The joint shown in FIG. 10 comprises two cast hinged sections 32. Cast hinged sections 32 may be cast metal such as iron, aluminum, or the like. Hinged sections 32 are square in cross section between slip-stop 31 and the end at which the hinge 26 is joined thereto. A portion of the cast hinged section 32 is inserted into rail 11. If a cylindrical rail such as rail 10 is employed, the portion of cast hinged section 32 which is inserted into the rail is circular in cross section and is slightly smaller in outside diameter than the inside diameter of rail 10. If rail 11 is employed, the portion of cast hinged section 32 which is inserted into rail 11 is rectangular in cross section and has outside dimensions slightly smaller than the interior dimensions of rail 11.

The slip-stops 31 are attached to cast hinged section 32 and are of the same outside diameter as the outside diameter of the rails. Slip-stops may be made of any suitable type of metal such as iron, steel, aluminum, or the like. The slip-stops prevent the cast hinged section 32 from sliding into the rails of the various sections 6, 7, or 8 of the portable hunting stand 5. The two cast hinged sections 32 have two hinges 26 and two hasps 28 connected thereto. The hasps have holes therein (not shown) for insertion of a pin 27. Pin 27, hasps 28, and chain 30 function in the same manner as described in the explanation of FIG. 7.

Figure 11:
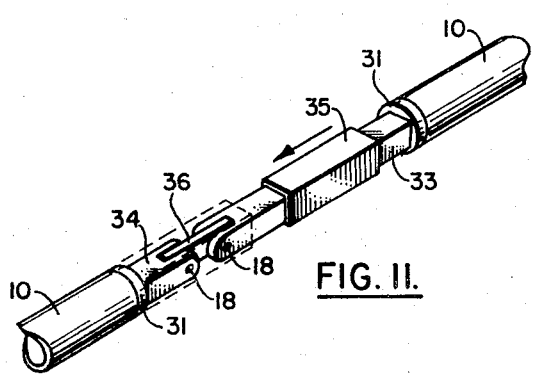
FIG. 11 is a perspective view of a hinged joint with a sliding locking mechanism.

In FIG. 11 is shown another type of hinged joint which may be employed in the present invention. The hinged joint consists of two sections, a long section 33, and a short section 34. Both sections 33 and 34 are rectangular in cross section. Sections 33 and 34 are joined by a tongue 36, which is attached to the joints 33 and 34 by means of pins 18. The pins 18 are attached to the ends of joints 33 and 34 and pass through holes (not shown) in the ends of tongue 36. Portions of the hinged sections 33 and 34 are inserted into rails 10. If cylindrical rails such as rails 10 are employed the portion inserted into the rails is circular in cross section. If rectangular rails 11 are employed the portions of hinges 33 and 34 which are inserted into the rails are rectangular in cross section. The hinge joint depicted in FIG. 11 is locked by sliding lock 35 over the hinge joint as indicated by the dotted line in FIG. 11. Lock 35 is a hollow, four-sided metal tube of square cross section which is slightly larger in interior dimensions than the exterior cross sectional dimensions of hinged sections 33 and 34. Slip-stops 31 prevent sections 33 and 34 from sliding completely into rails 10.

Figures 12A, 12B:
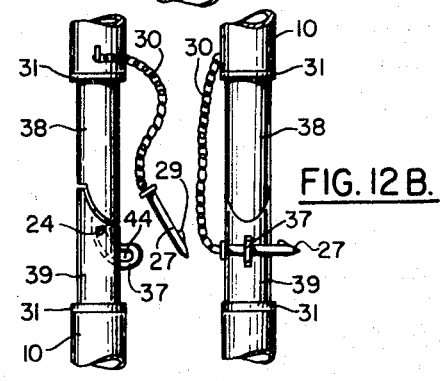
FIG 12a is a side elevational view of a hinged joint.
FIG. 12b is a front elevational view of a hinged joint.

FIGS. 12a and 12b depict another type of joint which may be employed in another embodiment of the present invention. The joint consists of an upper hinged section 38 and a lower hinged section 39, both of which are circular in cross section. The upper portion of hinge section 38 fits into interior of rail 10 and is circular in cross section. If rail section 11 is employed the portion of hinge section 39 inserted therein is rectangular in cross section. The two ends of upper section 38 and lower section 39 which meet together are curved to mate as shown in FIGS. 12a and 12b. Upper hinge section 38 has a curved tongue 37 attached thereto. The curved tongue 37 has a slot 44 therein. A pivot pin 24 attached to lower section 39 fits into slot 44 and when upper hinge section 38 is pulled upward the curved tongue 37 slides upward about pivot pin 24. Pivot pin 24 travels in slot 44 to prevent the separation of upper hinge section 38 from lower hinge section 39. Lower hinge section 39 has a slot (not shown) in the interior thereof for receipt of curved tongue 37. A pin 27 is located in lower hinge section 39 to engage slot 44. Pin 27 is secured to rail 10 by means of chain 30. Pin 27 and chain 30 function in the same manner as described above in the explanation of FIG. 7. Pin 27 may be inserted into slot 44 to prevent upper hinge section 38 and lower hinge section 39 from pivoting about pin 27. Hinge sections 38 and 39 are prevented from sliding completely into rail sections 10 by means of slip-stops 31.

In addition to the aforementioned embodiments the bottom portion of lower ladder section 6, as shown in FIGS. 3 and 1, may have attached thereto foot elements such as flat metal plates or the like to prevent the portion of the rails 10 which rest upon the ground from sinking into the ground. A rung 9 may be attached to rails 10 of lower ladder section 6 near the bottom portion of the section to prevent the lower ladder section 6 from sinking into soft ground. The rails 10 may be rectangular in cross section as are rails 11, or they may be of any other suitable cross-sectional configuration such as hexagonal, pentagonal, elliptical, or the like.

It is thought that the use of the device will be readily apparent from the consideration of the foregoing. If one of the hinged embodiments of the ladder section is employed the two ladder sections are merely folded out until the rail sections thereof are aligned and the hinges are locked into place by means of pin 27 or lock 35 as shown in FIG. 11. If the slip joint embodiment of the present invention is employed the three sections of the hunting platform are merely joined by sliding the rail sections 10 or 11 into sockets 20 or 21, or by sliding swaged end sections 23 into rail sections 10. The platform is then swung to the raised position, leaned against the tree as in FIG. 1 and affixed to the tree by extending rope 25 around the tree and into lock 14.

The foregoing is considered as illustrative only of the principles of the invention. Further, since numerous modifications or changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. A lightweight portable hunting stand consisting of:
   a. a lower ladder section having vertical tubular rails and horizontal tubular rungs connected to said rails;
   b. an upper ladder section having vertical tubular rails and horizontal tubular rungs connected to said rails;
   c. means for connecting said lower ladder section to said upper ladder section;
   d. a platform section composed of curved tubular rails and horizontal tubular rungs connected to said rails, said upper platform section having a flexible platform stretched about said rails; and
   e. means for connecting said upper ladder section to said platform section.

2. The hunting stand of claim 1 wherein said tubular rails are cylinder having a circular cross section.

3. The hunting stand of claim 2 wherein said connecting means comprises swaged lower end portions of said rails of both said platform section and said upper ladder section, said swaged end portions being of suitable outside diameter to slideably engage the interior of the upper ends of said rails of both said upper ladder section and said lower ladder section.

4. The hunting stand of claim 2 wherein said connecting means comprises cylindrical sockets connected to the lower ends of said rails of both said upper ladder section and said platform section, said sockets being of suitable inside diameter to slideably engage the exterior of the upper ends of both said upper ladder section and said lower ladder section.

5. The hunting stand of claim 4 wherein said sockets and said rails are rectangular in cross section.

6. The hunting stand of claim 2 wherein said connecting means comprises hinges attached to the lower ends of the rails of said platform section and said upper ladder section and to the upper ends of said rails of said upper ladder section and said lower ladder section.

7. The hunting stand of claim 6 wherein said ends of said rails to which said hinges are attached have locking means thereon for preventing said rails from pivoting about said hinges.

8. The hunting stand of claim 7 wherein said locking means comprises hasps attached to the ends of said rails generally adjacent to said hinges, each of said hasps having a hole therein and a pin adapted for inserting into said holes, said pin containing spring-loaded locking means to prevent accidental removal of said pin from said hasps and a chain connecting said pin to said rail.

9. The hunting stand of claim 2 wherein said connecting means comprises two cast hinged sections connected together by a hinge, each of said cast hinge sections having a portion which is rectangular in cross section and a portion which is circular in cross section and each of said circular portions being attached to the interior of the ends of said rails.

10. The hunting stand of claim 9 wherein said rails are rectangular in cross section and both of said portions of said cast hinge sections are rectangular in cross section.

11. The hunting stand of claim 2 wherein said connecting means comprises a hinged joint including a long section and a short section, both of said sections having a portion which is rectangular in cross section and a portion which is circular in cross section, each of said circular portions being attached to the interior of said rails, connecting means attached to said long section and to said short section, said connecting means including a tongue having a hole in each end thereof, a pin inserted through each of said holes, one of said pins being attached to said long section and the other of said pins being attached to said short section, and a sliding lock, said lock comprising a four-sided tube of rectangular cross section which slides over and encloses said tongue and pins to lock said joint.

12. The hunting stand of claim 11 wherein said rails are rectangular in cross section and both of said portions of said short section and long section are rectangular in cross section.

13. The hunting stand of claim 2 wherein said connecting means comprises an upper hinged section and a lower hinged section, the lower end of said upper section being curved and mating with the upper end of said lower section, both of said upper section and said lower section being circular in cross section and both being partially inserted into the interior of the ends of said rails, a curved tongue attached to said upper section, said tongue having an elongated slot therein, a pivot pin connected to said lower section and fitting through said slot, and a locking pin which fits into the end of said slot to lock said connecting means.

14. The hunting stand of claim 2 wherein said rails have holes in the sides thereof and said rungs are welded in holes, the ends of said rungs butting the interior of said rails.

15. The hunting stand of claim 14 wherein said rails are rectangular in cross section.

* * * * *